United States Patent [19]

Weibelzahl et al.

[11] Patent Number: 4,888,674
[45] Date of Patent: Dec. 19, 1989

[54] METHOD AND APPARATUS FOR DECOUPLING THE ACTIVE AND REACTIVE POWER CONTROL FOR A HIGH VOLTAGE DC TRANSMISSION LINE COUPLING TWO NETWORKS

[75] Inventors: Manfred Weibelzahl, Uttenreuth-Weiher; Georg Wild, Langensendelbach, both of Fed. Rep. of Germany

[73] Assignee: Siemens Aktiengesellschaft, Munich, Fed. Rep. of Germany

[21] Appl. No.: 288,282

[22] Filed: Dec. 21, 1988

[30] Foreign Application Priority Data

Dec. 23, 1987 [DE] Fed. Rep. of Germany ....... 3743997

[51] Int. Cl.$^4$ .............................................. H02J 3/36
[52] U.S. Cl. ........................................ 363/35; 363/51
[58] Field of Search ................ 363/35, 37, 51, 78, 363/84–88, 95, 96, 128, 129, 135–138

[56] References Cited

U.S. PATENT DOCUMENTS

| 3,949,291 | 4/1976 | Kanngiesser et al. | 363/35 |
| 4,494,179 | 1/1985 | Inokuchi et al. | 363/35 |
| 4,517,634 | 5/1985 | Sakai | 363/35 |
| 4,649,466 | 3/1987 | Rogowsky | 363/35 |
| 4,685,044 | 8/1987 | Weibelzahl et al. | 363/35 |
| 4,727,467 | 2/1988 | Bendl et al. | 363/35 |

FOREIGN PATENT DOCUMENTS

| 067978 | 5/1982 | European Pat. Off. |
| 156396 | 3/1985 | European Pat. Off. |
| 237032 | 3/1987 | European Pat. Off. |

Primary Examiner—Peter S. Wong
Attorney, Agent, or Firm—Kenyon & Kenyon

[57] ABSTRACT

A high-voltage d-c transmission system in which one of the converters is operated as a rectifier and the other as an inverter. A first cascade control which sets the rectifier control angle includes a superimposed active power controller and a subordinated d-c controller. A second cascade control which sets the inverter control angle includes a superimposed voltage/active power controller, a superimposed quenching angle control and a subordinated quenching angle controller. The setting signal of each of the two superimposed controllers are controlled in dependence on the control deviation of the other one of the superimposed controllers via a first or second pilot control for decoupling the cascade controls. The gain factors of the pilot control quantities depend on the operating point in such a manner that a small engagement of the pilot control variable exists for small control angles and a large engagement exists for large control angles.

10 Claims, 5 Drawing Sheets

METHOD AND APPARATUS FOR DECOUPLING THE ACTIVE AND REACTIVE POWER CONTROL FOR A HIGH VOLTAGE DC TRANSMISSION LINE COUPLING TWO NETWORKS

FIELD OF THE INVENTION

The present invention relates to a method and apparatus for controlling the active and reactive power transmission between two electrical networks which are coupled via a high voltage d-c transmission line (HVDC line), designed as a short coupling.

BACKGROUND OF THE INVENTION

A method for controlling the power factor or the voltage in a three-phase network by a high-voltage d-c short coupling is already known from German Published Unexamined Patent Application No. 19 62 042. It is a method for controlling the active and reactive power transmission between two electrical networks which are coupled via a high-voltage d-c transmission line (HVDC line), where each network is coupled via a controlled converter to the HVDC line. One of the converters is operated as a rectifier and the other converter as an inverter. A first control angle control variable for a control unit of the converter operated as a rectifier is derived by a subordinated current controller for d-c current in the HVDC line, and a reference value for the current controller is derived by a superimposed power controller for active power in one of said networks. A second control angle control variable for the control unit of the converter operated as an inverter is derived by a superimposed controller for at least one of the voltage and the reactive power in one of said networks.

In addition to the active power behavior, the reactive load behavior is influenced in this known method by a suitable COntrol of the converter installation of the HVDC line. For this purpose, an adjustment of the d-c current and the d-c voltage on the HVDC line according to predetermined functions is carried out simultaneously. For instance, for operation with a constant power factor, the reference value for the current as well as for the voltage control are set in separately depending on the actual active power reference value by a function generator.

A known control structure is shown in FIG. 1, with its operation being explained below and with the aid of FIGS. 2 and 3.

In FIG. 1, a known control structure for a high-voltage d-c transmission line (HVDC line) is shown. Two or three-phase power supply networks A and B are coupled to the ends of an HVDC line via controlled converters UR1 and UR2. The electrical parameters of the line have the reference symbols Id for the d-c current and Ud for the d-c voltage in FIG. 1. A smoothing inductance Ld for damping harmonics in the HVDC line is shown. Depending on the desired direction of the power transmission over the line, one of the two converters UR1, UR2 operates as a rectifier and the other one as an inverter In FIG. 1, it is assumed that the converter UR1 works as a rectifier and the converter UR2 as an inverter.

Two cascade controls control the active power P in one of the two networks and either the network voltage U or the reactive power Q in the remaining network. These cascade controls act on one of the two converters and are shown in FIG. 1 on the left side of the vertical dashed line marked with II. To the right of the dashed line marked with I is the respective subordinated controls of the two cascade controls. The superimposed controls of the cascade controls are to the left of dashed line I.

The control deviation $\Delta P$ formed from an active power reference $P^*$ and an active power actual value P is fed from summing junction 1 to a superimposed active power controller Rp. The output signal of this controller Rp serves as the reference value $Id^*$ for the d-c current on the HVDC line. The corresponding control deviation $\Delta Id$ is formed at a second summing junction 2 by comparison of the reference value $Id^*$ with the actual d-c value Id. The actual control angle $\alpha_{GR}$ for the converter operated as a rectifier is formed by a subordinated d-c component Ri in FIG. 1. The actual control angle $\alpha_{GR}$ is converted in a first control unit ST1 into corresponding firing pulses for the semiconductor switching elements of the converter UR1.

The second cascade control acts on the converter UR2 operated as an inverter in the example of FIG. 1. A superimposed controller Rq serves here either as a controller for the network voltage U or as a controller for the reactive power Q in one of the two networks, depending on the arrangement. Thus, the voltage or reactive power control deviation $\Delta U / \Delta Q$ for this controller is formed by comparison of the corresponding reference value $(U^*/Q^*)$ with the corresponding actual values U/Q at a third summing junction 3. In FIG. 1, the output signal of the superimposed controller Rq is the reference value $\gamma^*$ for the quenching angle of the inverter UR2. A control deviation $\Delta\gamma$ is formed by comparison of the reference value $\gamma^*$ with the actual quenching angle value $\gamma$ at a fourth summing junction 4 and then fed to a subordinated quenching angle controller R1. The control angle $\alpha_{WR}$ for the inverter UR2 is produced by controller R1 and then converted in a further control unit St2 into corresponding firing pulses for the semiconductor switching elements. The inverter influences, according to the actual value of the control angle $\alpha_{WR}$, the d-c voltage Ud on the HVDC line as to magnitude and sign.

In a known embodiment, not illustrated, the subordinated quenching angle control R1 is omitted. In this case, the superimposed voltage or reactive power controller Rq sets the control angle for the inverter UR2 directly. In another known embodiment, the lead angle $\beta$ or the quenching angle $\gamma$ are used directly as a control input for the converter UR2 instead of the control angle $\alpha_{WR}$ which also takes into consideration the overlap angle u.

The operation of the known circuit of FIG. 1 will further be explained briefly with reference to the family of characteristics of FIG. 2. For this example, it is assumed that the superimposed controller Rq of the second cascade control influences the reactive power Q in one of the networks. Accordingly, the family of characteristics of FIG. 2 shows the relationship between the active power P and the reactive power Q, divided by the nominal values $P_N$ and $Q_N$, respectively. As further parameters, the family of characteristics contains the d-c current Id on the HVDC line, the control angle $\alpha_{WR}$ during the rectified operation of the respective converter and the quenching angle $\gamma_{WR}$ in inverter operation of the respective converter.

Assuming that the converters UR1 and UR2 of the HVDC line of FIG. 1 are not equipped with additional reactive power generators which can be connected and disconnected, such as capacitor banks, smoothing chokes and transformer stepping switches, the family of characteristics in FIG. 2 shows all permissible operating points regardless of whether the converter in question is operated as a rectifier or an inverter. The portion of the family of characteristics shown in FIG. 2 is chosen so that the operating points which occur at small and medium values of the rectifier control angle or the inverter quenching angle up to about 60. el can be seen. If the influence of overlap, depending on the operating point, on the individual parameters of the family of characteristics is neglected, the straight line characteristics resulting for a constant rectifier control angle or inverter quenching angle go through the origin, not shown, of the diagram. In such a case, the rectifier control angle or the inverter quenching angle would be identical with the load angle $\phi$ on the network side of the respective converter. In FIG. 2, such a straight line is shown as an example for a load angle of $\phi=45°$. The operation of the circuit of FIG. 1 will be explained further by means of the transitions from an operating point AP1 to AP2 or from an operating point AP3 to AP4.

The operating point AP1 of a converter travels to AP2 if the active power reference value P* of the active power control $R_p$ is changed by the value $\Delta$ P12. If in the circuit of FIG. 1 only the first cascade comprising the superimposed power controller Rp and the subordinated d-c current controller Ri were in operation, the operating point AP1, would adjust itself by changing the d-c current Id by the value $\Delta Id12$. If then, the second control cascade of the superimposed reactive power controller Rq and the superimposed quenching angle controller R1 were in operation, the undesired reactive power control deviation $\Delta$ Q12 of the operating point AP1' from the desired operating point AP2 would be compensated by changing the quenching angle by the value $\Delta\gamma 12$. Since normally both control cascades of the circuit of FIG. 1 are in operation, the transition between the operating points AP1 and AP2 actually takes place on the locus curve OK12 shown in FIG. 2.

It can be seen from FIG. 2 that between the active power change $\Delta P12$ which represents the cause for the operating point transition, and the d-c current change caused by means of the control intervention of the subordinated controller Ri by the value $\Delta Id12$, an acute angle $\delta 12$ is present. For this reason, the second control cascade comprising the reactive power and the quenching angle control can compensate a reactive power control deviation caused by the control action of the d-c current control. This is done by adjusting the quenching angle by the value $\Delta\gamma 12$ so fast that the operating point AP1 changes into the operating point AP2 on the locus curve OK12 without overshoot and with a small temporary reactive power control deviation.

The transition on the locus curve OK34, from the operating point AP3 to the operating point AP4 upon a change of the reactive power reference value by $\Delta Q34$, takes place in a very similar manner. Assuming that in this case, initially only the second control cascade of the superimposed reactive power controller Rq and the subordinated quenching angle control R1 is in operation, the operating point AP3 would first change to the operating point AP3', due to the control action of the controller Rq by a change of the quenching angle by the value $\Delta\gamma 34$. If subsequently the first control cascade comprising the active power and the d-c current controllers were taken into operation, the undesired active power deviation $\Delta$ P34 would be eliminated by a change of the d-c current by the value $\Delta$ Id34. The operating point AP3', would thereby make the transition into the actually desired operating point AP4. Also in this case, the reactive point control deviation $\Delta$ Q34, which represents the cause for the operating point transition, and the quenching angle change $\Delta\gamma 34$ due to the control action of the subordinated controller Rq occupy an acute angle $\delta 34$ relative to each other. Thus, the transition from AP3 to AP4 takes place without overshoot in the normal case and with simultaneous operation with both cascade controls and with a small temporary active power control deviation on the locus curve OK34.

In this manner, any desired operating point transition due to a stepwise change, for example, of the active or reactive power reference value is possible with the known control of FIG. 1, in the portion of the family of characteristics shown in FIG. 2. This holds true for small and medium rectifier control angles or inverter quenching angles with good damping and therefore with high stability of all control loops.

It has been found, however, that the stability of such a control decreases with increasing rectifier control angle or inverter quenching angle and that a stability limit is reached at angle values between about 60° and 70°. In FIG. 2, a "straight stability line" SG is drawn as an example. This stability line or limit SG will be explained briefly by the example of the further portion, shown in FIG. 3, of a family of characteristics corresponding to FIG. 2. From this further portion can be seen specifically the operating points for a converter of an HVDC line operated as a rectifier or inverter which occur for medium and large rectifier control angles and inverter quenching angles.

In FIG. 3, the transitions from an operating point AP5 to AP6 and from an operating point AP7 to AP8 are shown by way of example. The operating point of a converter travels, for instance, from AP5 to AP6 if the active power reference value is changed by $\Delta$ P56. It is assumed in this case that initially only the first cascade control of the active power and d-c current control Rp and Ri is in operation, so that the operating point AP5 is displaced due to the very large change of a d-c current actual value $\Delta$ Id56 to the operating point AP5'. This operating point differs from the desired operating point AP6 by a large reactive power control deviation $\Delta$ Q56. There is no longer an acute angle $\delta$ 56 between the change of the active power reference value $\Delta$P56 causing the operating point transition and the change of the d-c current due to the control action of the subordinated d-c current controller Ri in the region of the family of characteristics of FIG. 2. For this reason, the actual transition from the operating point AP5 to AP6 while both control cascades are in operation simultaneously, will take place with considerable overshoot on a locus curve OK56.

If such a transition behavior as above is present, it cannot be expected in practice that stable operating points can be set. Rather, due to the small damping in the control loops in this region of the family of characteristics, it is to be expected that a continuous oscillation of the actual operating point about the desired point occurs. This is because the very smallest disturbances on the line will cause a disproportionately large control action especially of the subordinated d-c current control Ri.

A transition, for instance, from the operating point AP7 along a locus curve OK78 to the operating point AP8 takes place in a very similar manner if the reactive power reference value is changed by ΔQ78. Also in this case, the transition is accompanied by a considerable overshoot of the reactive s power control variable causing the change since an obtuse angle Δγ78 is present between the reactive power control deviation ΔQ78 and the change in the quenching angle by Δγ78 caused by the subordinated quenching angle controller RL. This occurs if the second control cascade comprising the reactive power and the quenching angle control is operated alone. Practice has shown that with the known control structure of FIG. 1, no stable operating point can be adjusted above the straight stability line SG shown as an example in FIG. 3. Rather, all control variables hunt more or less violently and continuously about the desired reference values.

SUMMARY OF THE INVENTION

The present invention solves the above problem by providing a method for controlling the converters of an HVDC line in which a sufficiently damped stable operation of the line is possible for medium and large rectifier control angles or inverter quenching angles. Furthermore, a suitable control apparatus for carrying out the method according to the invention will be described.

This and other problems are solved according to the invention by providing a method for controlling the active and reactive power transmission between electrical networks which are coupled via a high-voltage d-c transmission line (HVDC line). Each of the networks is coupled via a controlled converter to the HVDC line, with one of the converter being operated as a rectifier and the other converter as an inverter. A first control angle control variable, for the control unit of the converter operated as a rectifier, is given by a subordinated current controller for d-c current in the HVDC line. A reference value for the current controller is given by a superimposed power controller for active power in one of the networks. A second control angle control variable, for the control unit of the converter operated as an inverter, is given by a superimposed controller for either the voltage or the reactive power in one of the networks. The method comprises the steps of adding a first pilot control variable with a negative sign to an output signal of the superimposed voltage/reactive power controller. This first pilot control variable depends, at a respective operating point, on the rate of change of the control angle for the converter operated as an inverter to the change of the active power and on the actual active power control deviation. A second pilot control variable is added to the output signal of the superimposed active power controller. This second pilot control variable depends at a respective operating point on the rate of change of the actual d-c current value, and on the change of at least one of the voltage and reactive power, and on the actual voltage or reactive control deviation.

The invention also provides apparatus for controlling active and reactive-pilot transmission between two electrical networks whiCh are coupled via a high-voltage d-c current transmission line and a controlled converter. One of the converters is operated as a rectifier and the other is operated as an inverter. The apparatus comprises a subordinated current controller for d-c current in the HVDC line which sets a first control angle control variable for the control unit of the rectifier converter. The apparatus has a superimposed active power controller for active power in one of the networks, which sets a reference value for the subordinated current controller. A superimposed controller for at least one of the voltage and the reactive power in one of the networks sets a second control angle control variable for the control unit of the inverter converter.

A first characteristic generator in this apparatus weights a first control deviation at the input of the superimposed active power controller. The first control deviation is weighted by a sine function of the phase shift angle between the voltage and the current in one of the networks divided by the product of an ideal no-load d-c voltage and d-c current. This first weighted control deviation is added with a negative sign to the output signal of the superimposed voltage/reactive power controller as a first pilot control variable.

The apparatus has a second characteristic generator which weights a second control deviation at the input of the superimposed voltage/reactive power controller. The second control deviation is weighted by the sine function of the phase shift angle divided by the ideal no-load d-c voltage. The second characteristic generator adds this second weighted control deviation to the output signal of the superimposed active power controller as a second pilot control variable.

DETAILED DESCRIPTION

Figure 1:
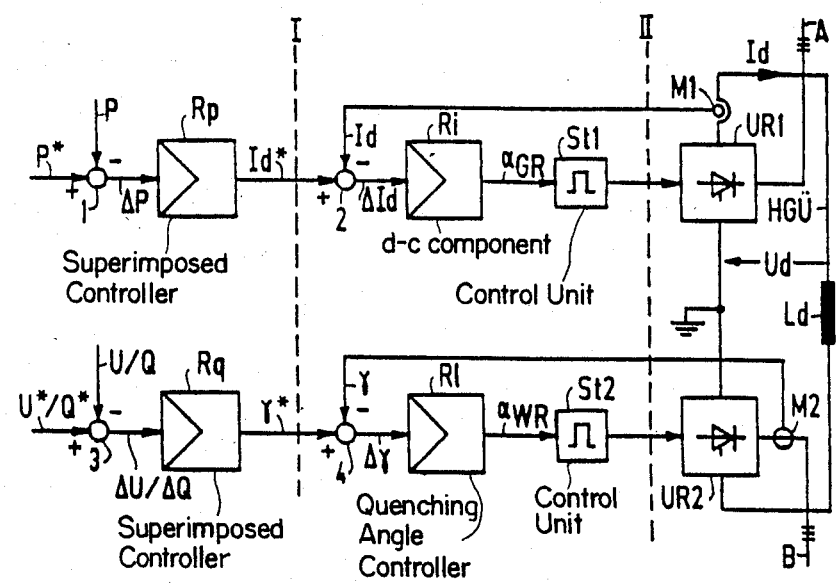
FIG. 1 shows a known control structure for influencing the converters of an HVDC line.

According to the method of the invention, there is added to the output signal of each of the two superimposed controllers in the first and second cascade control, a pilot variable with a corresponding sign which depends on the control variable belonging to the other one of the two superimposed controllers. There is thus added to the quenching angle reference value $\gamma^*$ at the output of the superimposed voltage or reactive power controller Rq of the second cascade control in FIG. 1, a first pilot variable which depends on the deviation $\Delta P$ of the control variable P at the input of the superimposed active power controller Rp of the first cascade control. If in another embodiment of the control, for instance, there is no subordinated quenching angle controller RI, then the first pilot variable can be added directly to the inverter control angle $\alpha_{WR}$. Similarly, a second pilot variable is added to the d-c current reference value Id* at the output of the superimposed active power controller Rp of the first cascade control which depends on the deviation $\Delta U$ or $\Delta Q$ of the control variable U or Q, respectively, at the input of the superimposed voltage or reactive power controller Rq of the second cascade control.

The "gain factors" belonging to the two pilot control variables take into consideration here, according to the method of the invention, an operating point dependence of the desired pilot influence of the control deviation of one of the superimposed controllers on the control signal of the other of the superimposed controllers. Thus, according to the dependences between the parameters: active power P, reactive power Q, d-c current Id and rectifier control angle $\alpha_{GR}$ or inverter quenching angle $\gamma_{WR}$ given by the families of characteristic of FIGS. 2 and 3, the control signal of each of the two superimposed controllers leads the control signal of the other controller. This is done by means of the corresponding pilot control variable via the control deviation of the other of the two controllers so as to decouple the two cascade controls.

The first pilot variable is obtained from the weighting of an actually present active power control deviation $\Delta P$ with a first gain factor. The value of the gain factor corresponds to the rate of change of the inverter control angle or the inverter quenching angle relative to the active power which can be taken from the families of curves of FIG. 2 and 3 and which is present at the respective operating point of the control before the active power change occurred. It can be shown that, for generating a suitable control direction, the first pilot variable formed by weighting an active power control deviation with such a gain factor depending on the operating point must be added to the output signal of the controller Rq with a negative sign. An undesired deviation is to be expected due to the coupling of the two cascade controls via the controlled system and the gradients of the converter characteristics at the respective operating point. With such a pilot control of the control variable of the converter UR2 operated as an inverter, it is achieved, for a step-shaped change of the active power control deviation $\Delta P$, that the undesired deviation is preset directly in the other control variable Q of the second cascade control. This is preset via the control variable of the corresponding reactive power controller.

By this method, the occurrence of a reactive power deviation normally caused undesirably and possibly delayed by the control system itself, is anticipated so that stable operating points can still be set for unfavorable operating points of the controller. This is true even for medium and large rectifier control angles or inverter quenching angles. Furthermore, the degree of the intervention of the first pilot control variable adapts itself to the actual present conditions due to the operating-point dependence on the corresponding gain factor. This will be explained briefly by the example of FIGS. 2 and 3.

For this purpose, it is assumed that the HVDC line has settled to a steady state at the operating point AP1.

Figure 2:
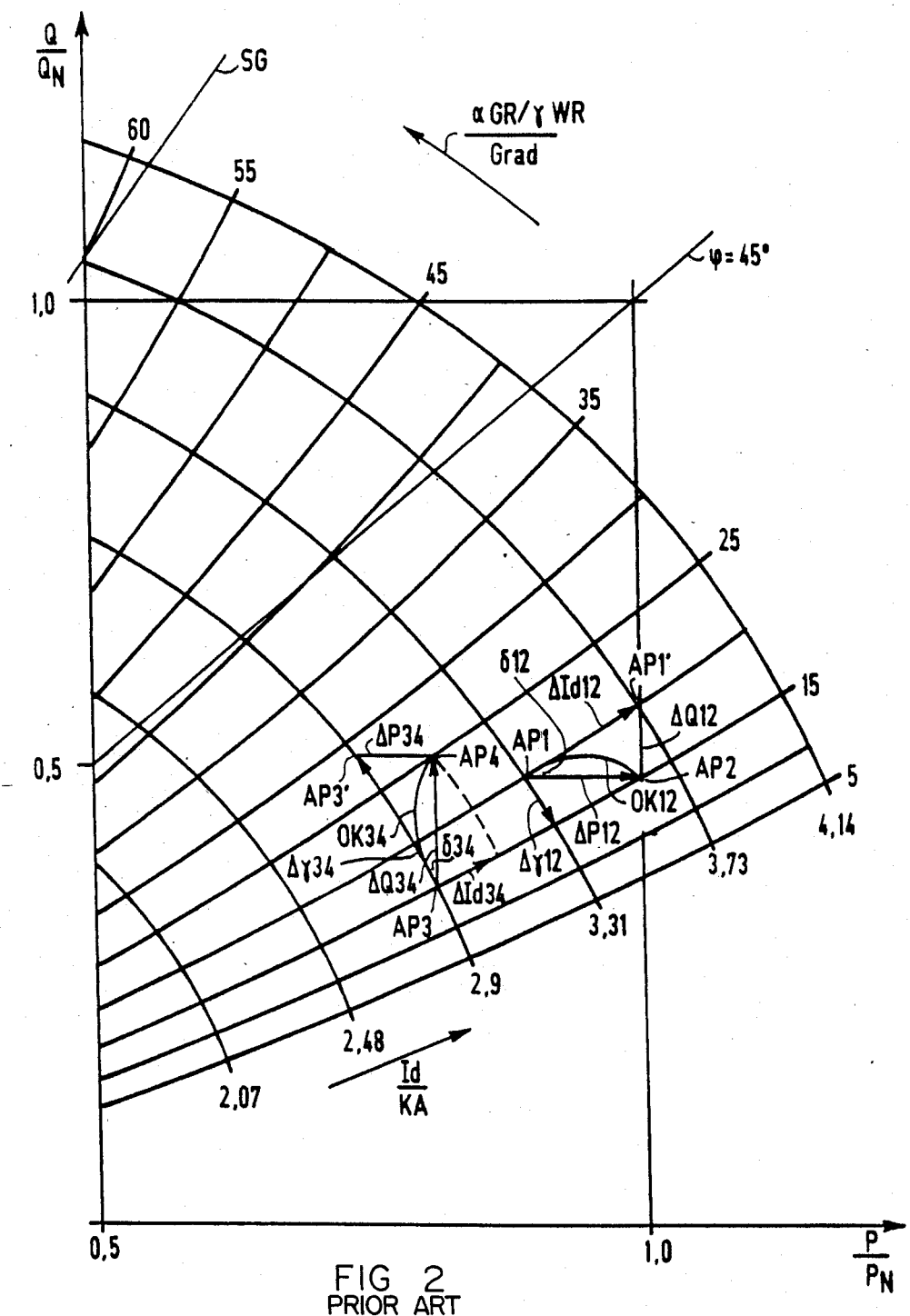
FIG. 2 illustrates a portion of a family of characteristics representing the relationship between the active power, reactive power, d-c current and control angle for a converter operate small and medium control angles.

This point AP1 is shown in the portion of the family of characteristics shown in FIG. 2 at the relatively small rectifier control angle $\alpha_{GR}$ or the inverter quenching of $\gamma_{WR}$ of about 20°. Starting from this point API, if the active power control variable P of the superimposed controller Rp is changed by $\Delta P12$, it must be expected, as already explained theoretically, that the relatively small undesired reactive power control deviation $\Delta Q12$ takes place. This assumes intervention of the first cascade control alone. Such a deviation, however, can be compensated relatively easily by the second cascade control via a quenching angle change by $\Delta \gamma 12$.

As already discussed, the operating points located in this area of the family of characteristics are relatively stable and the two cascade controls are consequently coupled to each other only slightly via the HVDC line. Therefore, for operating point transitions, the aiding effect of the first pilot control variable is basically not required. Accordingly, as provided by the present invention, the intervention of the first pilot control variable on the control signal of the superimposed control of the second cascade control is small. This is because the rate of change of the inverter control angle or inverter quenching angle, which also determines the gain factor of the first pilot control variable, is small as compared with the active power in this area of the family of characteristics.

According to the invention, with the increase of the control angle and therefore of the coupling of the two cascade controls which is basically undesirable, the degree of intervention of the first pilot control variable directly increases due to the Operating point dependence of the corresponding gain factor. By comparing the position of the operating point AP1 in FIG. 2 with the position of the operating point AP5 with an inverter quenching angle of about 75° in FIG. 3, it can be seen that at AP5, the rate of change of the inverter quenching angle in relation to the active power is substantially larger than in AP2. For an active power change of, for instance, $\Delta P56$, the first pilot control variable will therefore lead the control signal of the reactive power controller Rq considerably more. This, however, is particularly necessary in this area of the family of characteristics since, as already explained, an active power change $\Delta P56$ would theoretically cause the very large undesired reactive power control deviation $\Delta Q56$ if the first cascade control were in operation alone.

The effect of the second pilot control variable can be explained in a similar manner. The second pilot control variable is obtained, according to the invention, from the weighting of an actually present voltage or reactive power control deviation ($\Delta U/\Delta Q$) with a second gain factor. Its value corresponds to the rate of change of the HVDC d-c current compared to the reactive power which can be taken from the families of curves of FIGS. 2 and 3 and which prevails at the operating point of the control before the control variable change takes place. The second pilot control variable must be added to the output signal of the controller Rp for generating the suitable sense of control. This is done by weighting a reactive power control deviating with a second pilot variable having a positive sign formed with a gain factor that depends on the operating point, to the output signal of the controller Rp. The method according to the invention therefore makes possible by a suitable pilot control of the control variables of the individual converters of the HVDC line, a decoupling of the corresponding cascade controls. Thus, any desired operating point located above the straight stability line SG shown in FIGS. 2 and 3 can be adjusted stably.

Figure 4:
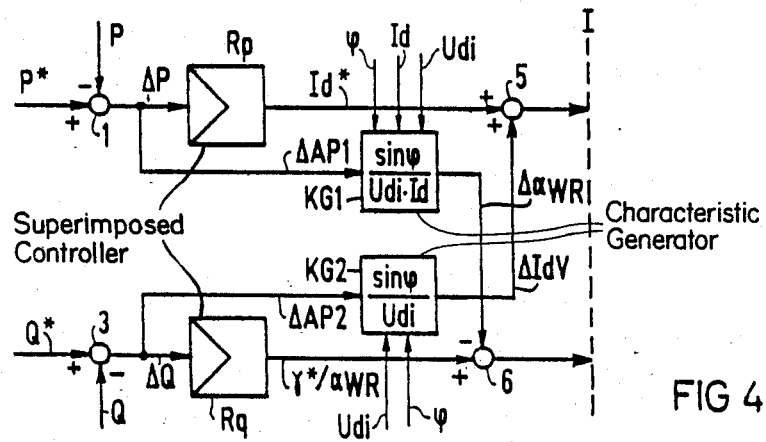
FIG. 4 embodiment of the control apparatus for an HVDC line according to the present invention.

Referring to the FIGS. 4 to 8, exemplary apparatus for carrying out the method according to the invention will be described. In the circuit of FIG. 4, the input of the superimposed active power control Rp is connected to the output of the superimposed reactive power controller R$\zeta$ via a first characteristic generator KG1. The input of the superimposed reactive power controller Rp is coupled to the output of the superimposed active power controller Rp via a second characteristic generator KG2. The first pilot control variable at the output of KG1 is designated $\Delta\alpha$WR and is added (with a negative sign) to the quenching angle reference value $\gamma^*$ or inverter control angle $\alpha_{WR}$ via a summing junction 6. Similarly, the second pilot control variable at the output of KG2 is designated $\Delta$IdV and is added with a positive sign to the d-c current reference value Id* at the output of the active power controller via a summing junction 5.

An operating point change $\Delta$API, for instance, caused by a step-like change of the active power reference value P*, is processed in the embodiment of FIG. 4 by weighting the active power control deviation $\Delta$P with the first gain factor to form the first pilot control variable $\Delta\alpha_{WR}$. The first gain factor is dependent on the operating point and is stored in the first characteristic generator KG1. The characteristic generator simulates the gain factor in the form of the sine function of the load angle $\phi$ between the voltage and the current preferably in that network in which the active power P is to be controlled, this sine function then being divided by the product of the ideal no-load d-c voltage Udi and the d-c current Id. In some embodiments, constants are assumed for the ideal no-load d-c voltage and the d-c current, the values of which lie preferably in the middle of the operating range, especially in the vicinity of the nominal operating point.

Figure 3:
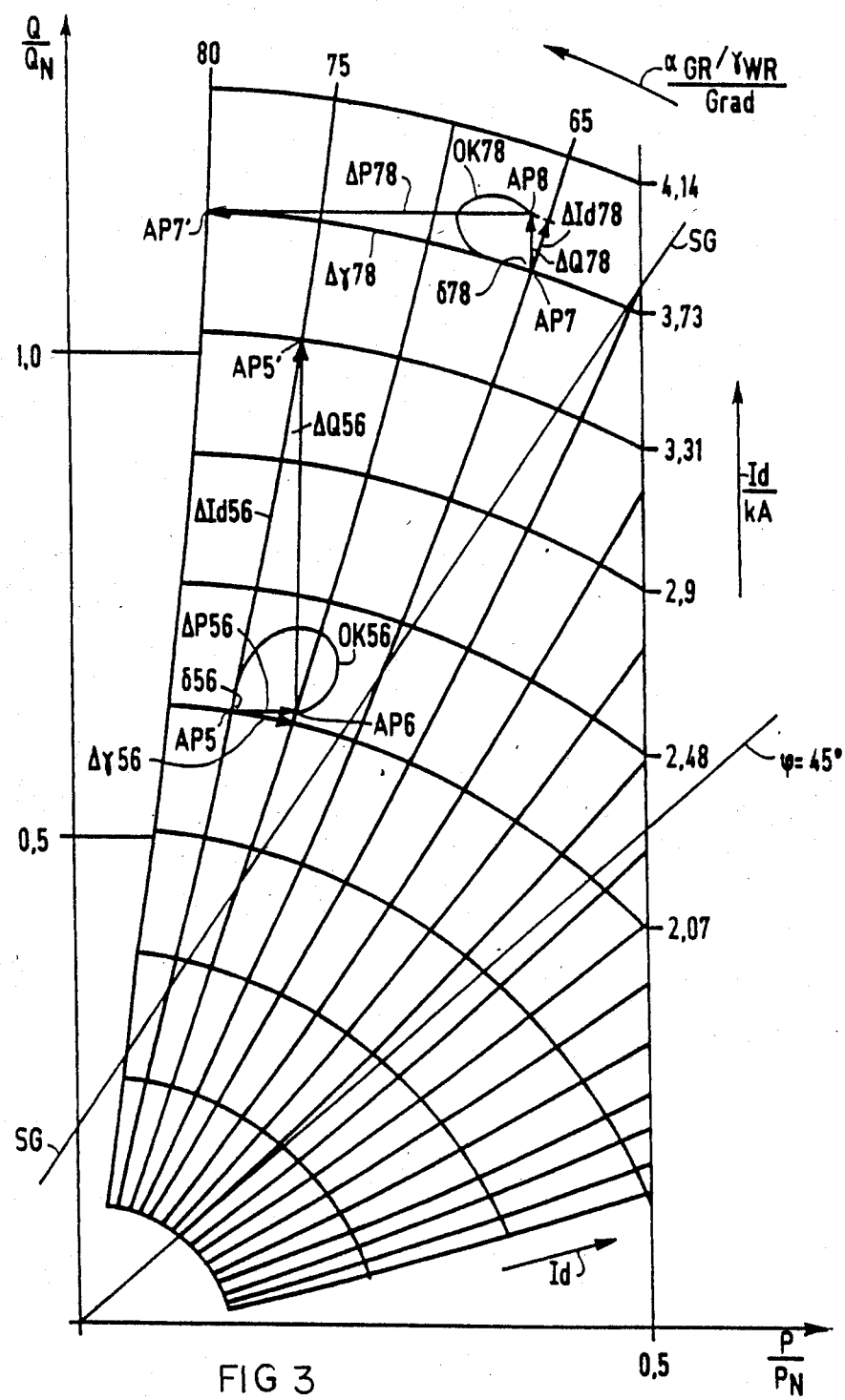
FIG. 3 illustrates a portion of a family of characteristics similar to FIG. 2 for a converter operated at medium and large control angles.

The degree of intervention of the first pilot control variable therefore depends primarily on the sine function of the load angle. As can be seen, from FIGS. 2 and 3, for a converter in the HVDC line, this sine function increases for a change of the rectifier control or inverter quenching angle from a value slightly larger than 0 at about 5°, to a value slightly smaller than 1 at about 80°. A first gain factor formed in this manner according to the present invention makes it possible for the first pilot control variable $\Delta\alpha_{WR}$ to be nearly ineffective for small inverter control angles and reach its full engagement only at operating points above the straight stability line SG, i.e., at medium and large inverter control angles. In another embodiment of the invention, it is possible to slave the d-c current Id on the HVDC line, assumed so far to be constant, to the actually present actual value. In this manner, a still finer matching of the first gain factor in the first characteristic generator KG1 to the actually present operating point in the family of characteristics of FIG. 2 or 3 is achieved.

A change of the operating point $\Delta$ AP2 which is caused, for instance, by a step-like change of the reactive power reference value Q* is processed in a similar manner. This is done by lighting the reactive power control deviation $\Delta$Q at the input of the reactive power controller Rq via the second characteristic generator KG2 to form the second pilot control variable $\Delta$IdV for the control signal of the active power controller Rp. The gain factor for the second pilot control variable, which is dependent on the operating point and is made available via the second characteristic generator, is preferably simulated in that network in which the active power is to be controlled. The gain factor is simulated by the sine function of the load angle $\phi$ between the voltage and the current, divided by the ideal no-load d-c voltage Udi. In another contemplated embodiment, a constant value for the ideal no-load d-c voltage is set preferably in the middle of the operating range, especially at the nominal operating point. Thus, the second pilot control variable also depends primarily on the sine function of the load angle and reaches the highest possible degree of intervention at medium and large inverter quenching angles.

Figure 5:
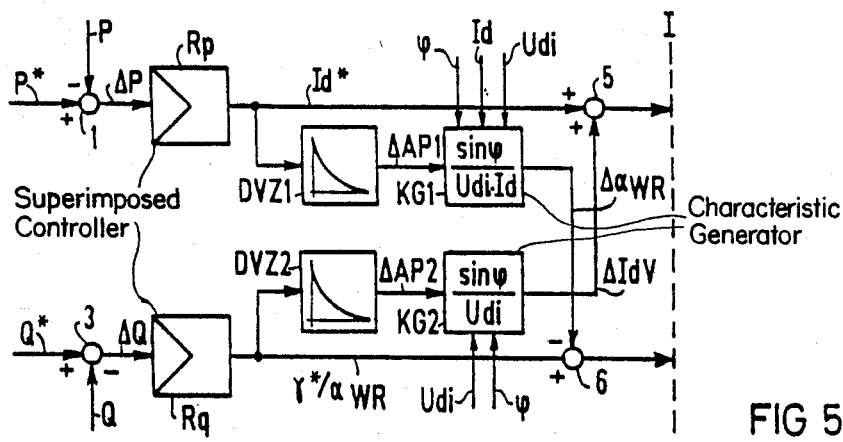
FIG. 5 shows another embodiment of the control apparatus for an HVDC line according to the present invention.

In FIG. 5, another embodiment of a control circuit according to the invention is shown. In FIG. 4, the operating point changes $\Delta$API, $\Delta$AP2 were detected by evaluating the corresponding control deviation at the input of the respective superimposed controller. In FIG. 5, the output signals Id* and $\gamma^*/\alpha_{WR}$ of the respective superimposed controllers are conducted via additional characteristic generators DVZ1 and DVZ2 with differentiating delaying transmission behavior (D-T$_1$ stage). The output signals of DVZ1 and DVZ2, i.e., $\Delta$AP1 and $\Delta$AP2 are made available as input variables to the respective characteristic generators KG1 and KG2. Since the superimposed controllers Rp and Rq have as a rule a proportional-integrating transmission behavior (PI-controllers), their transmission behavior is almost compensated by the subsequent D-T$_1$ stage. Thus, an input signal almost corresponding to the respective control deviation is fed to a respective characteristic generator. This embodiment of the invention provides that the control variable at the input of one of the superimposed controllers does not act directly via the corresponding characteristic generator on the control signal of the other superimposed controller. Instead, the damping transmission behavior of the respective superimposed controller Rp and Rq is interposed. Through a suitable choice of the gain factors for the additional characteristic generators DVZ1 and DVZ2, additional, and in some cases relatively undamped, control loops closed in the HVDC line can be avoided.

Figure 6:
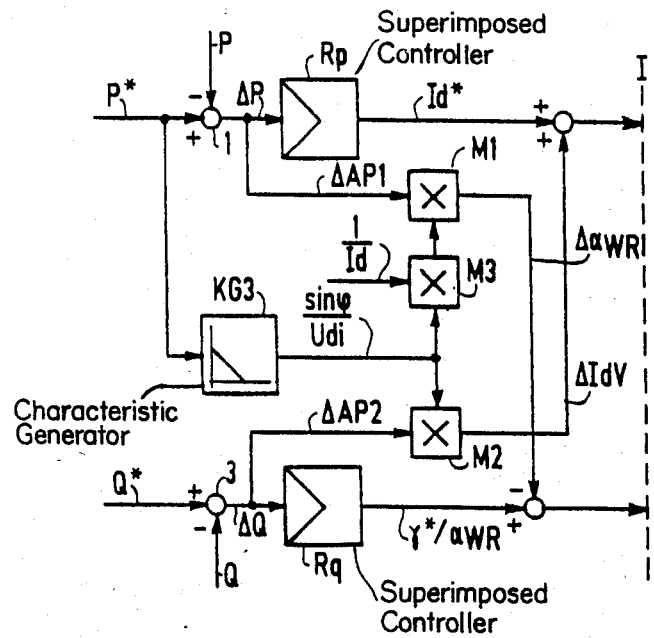
FIG. 6 shows another embodiment of the control apparatus according to the present invention for an HVDC line.

In FIG. 6, another embodiment of the apparatus according to the invention is shown. Here the quotient of the sine function of the load angle and the ideal no-load voltage Udi serving as a gain factor is approximated in a further characteristic generator KG3 as a function of the active power reference value P* in the form of a declining straight line characteristic. In this embodiment, the actual value of the load angle $\phi$ does not need to be determined separately. The first pilot control quantity $\alpha_{WR}$ is thus obtained by first multiplying the output of generator KG3 by the reciprocal of the HVDC current Id in multiplier M3 and then multiplying the output of multiplier M3 by the operating point change $\Delta$AP1 detected via the active power change $\Delta$P. In a similar manner, the second pilot control variable $\Delta$IdV is determined by multiplying in another multiplier M2 the output signal of the characteristic generator KG3 with an operating point change AP2 that is detected via the reactive power change $\Delta$Q. Also, in the embodiment shown in FIG. 6, the operating point changes $\Delta$AP1 and $\Delta$AP2 according to the circuit of FIG. 5 can be taken off via additional D-T$_1$ elements DVZI and DVZ2 at the outputs of the superimposed controllers.

Figure 8:
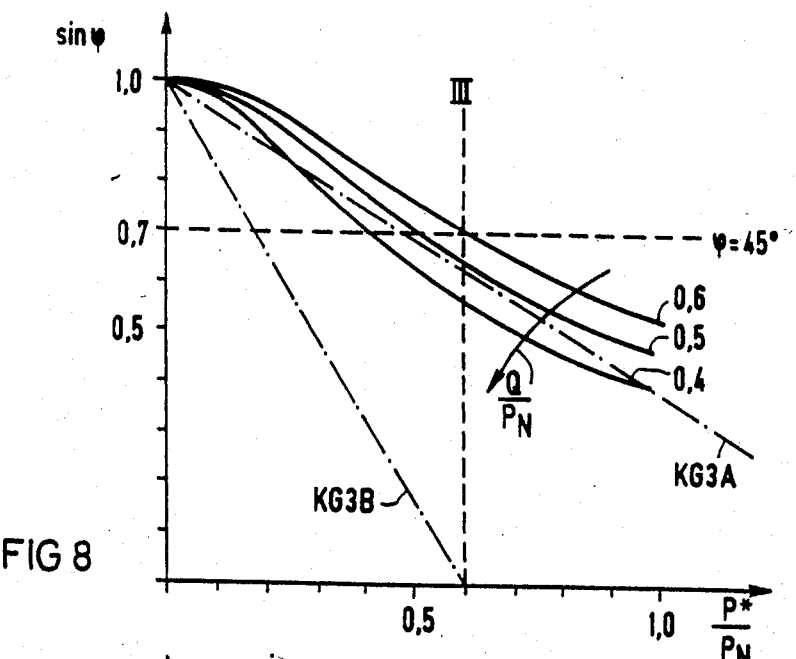
FIG. 8 illustrates the sine function of the phase shift angle between current and voltage in one of the networks.

It will now be explained, referring to FIG. 8, how the straight characteristic with a negative slope can be formed in the characteristic generator KG3. The waveform of the sine function of the load angle φ versus the active power reference value P* divided by the nominal value $P_N$ is plotted for several values of the reactive power Q. Since in practice HVDC transmission lines are operated preferably with a relative reactive power value of about 50%, three specific waveforms of sin φ for $Q/P_N=0.4$, 0.5, and 0.6 are shown in FIG. 1. In one embodiment, the sine function of the load angle can be approximated by the dash-dotted straight line shown in FIG. 8 and designated as KG3A.

As was already explained in connection with FIGS. 2 and 3, the intervention of the pilot control variables for decoupling the cascade controls is required especially with medium and large inverter quenching angles, i.e., for load angles φ having a Value larger than 45°. For this reason, the slope of the straight line approximating sin φ can also be chosen larger. In FIG. 8, such a straight line is drawn dashed-dotted and is designated with KG3B. This straight line is laid out so that the pilot control variables $\Delta\alpha_{WR}$ and $\Delta IdV$ no longer are in engagement at operating points which have a relative reactive power value of about 50% and a load angle φ of more than 45°. These operating points are therefore located to the right of the vertical separation line III shown dashed in FIG. 8.

Figure 7:
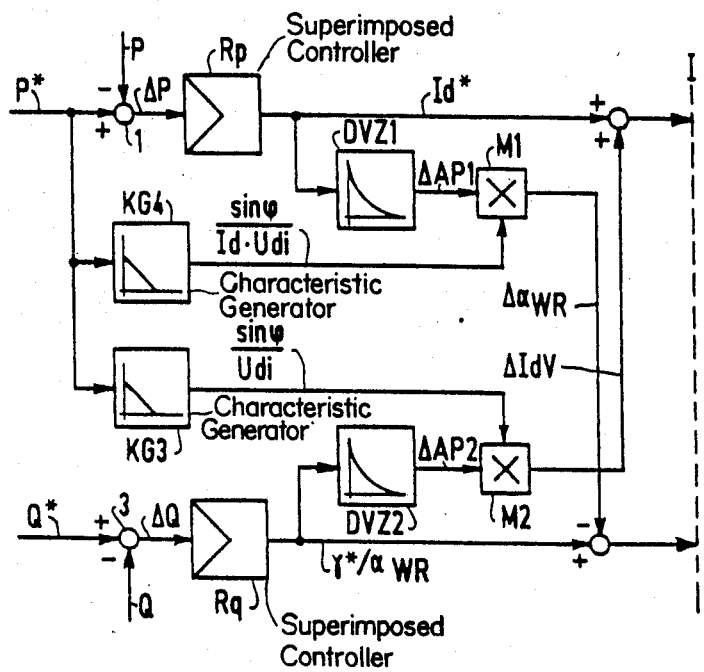
FIG. 7 shows another embodiment of the control apparatus for an HVDC line according to the present invention.

In FIG. 7, another embodiment of the apparatus according to the invention is shown. Here, the operating point changes ΔAP1 and ΔAP2 are determined by evaluation of the controller output variables via additional characteristic generators DVZI and DVZ2. The operating point changes ΔAP1 and ΔAP2 are then fed to a first or second multiplier M; or M2 for forming the respective pilot control variable, as in the embodiment of FIG. 6. In the embodiment of FIG. 7, the operating point-dependent gain factors necessary for forming the pilot control variables are simulated in two characteristic generators KG3 and KG4. Depending on the active power reference value P*, the gain factors are separated in the form of two straight line characteristics with different negative slopes, for example. In this embodiment, the characteristic generator KG3, similar to the characteristic generator KG2, approximates the sine function of the load angle divided by the ideal no-load d-c voltage Udi. The characteristic generator KG4 simulates, like the characteristic generator KG1 of the embodiment in FIGS. 4 and 5, the sine function of the load angle divided by the product of the ideal no-load d-c voltage, divided by the d-c current on the HVDC line.

Figure 9:
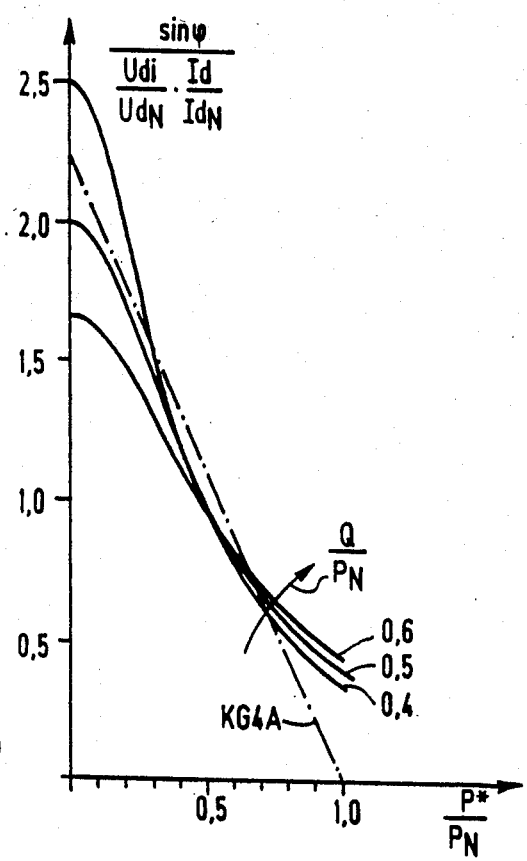
FIG. 9 illustrates the sine function between the phase shift angle between current and voltage in one of the networks, divided by the ideal d-c voltage and the d-c current.

In FIG. 9, the quotient sin φ/Udi*Id is again shown for the three reactive power values Q=0.4, 0.5 and 0.6 divided by the nominal operating point $P_N$. For better clarity, the ideal no-load d-c voltage Udi and the HVDC d-c current were divided by the respective nominal operating values $Ud_N$ and $Id_N$. A declining straight line characteristic for the characteristic generator KG4 is shown in FIG. 9 dash-dotted and is designated with KG4A. The desired decoupling of the two cascade controls is achieved in the embodiment of FIG. 7, by providing a declining characteristic with a negative slope corresponding approximately to the characteristic KG3A of FIG. 8, and providing for the characteristic generator KG4 a declining characteristic with a negative slope corresponding approximately to the characteristic KG4A of FIG. 8.

What is claimed is:

1. A method for controlling the active and reactive power transmission between two electrical networks which are coupled via a high-voltage d-c transmission line (HVDC line) where each said network is coupled via a controlled converter to the HVDC line, with one of the converters being operated as a rectifier and the other converter as an inverter, the control angle control variable for the control unit of the converter operated as a rectifier being given by a subordinated current controller, for control of d-c current in the HVDC line, a reference value for said current controller being given by a superimposed power controller for active power in one of said networks, the control angle control variable for the control unit of the converter operated as an inverter being derived from the output of a superimposed controller for at least one of the voltage and the reactive power in one of said networks, the method comprising the steps of:

adding a first pilot control variable with a negative sign to the output signal of the superimposed voltage/reactive power controller, said first pilot control variable depending, at a respective operating point, on the rate of change of the control angle for the converter operated as an inverter to the change of the active power and on the actual active power control deviation; and adding a second pilot control variable to the output signal of the superimposed active power controller, said second pilot control variable depending, at a respective operating point, on the rate of change of the actual d-c current value, and on a change of at least one of the voltage and reactive power, and on the actual voltage or reactive power control deviation.

2. The method according to claim 1, further comprising the steps of setting the control angle control variable for the converter operated as an inverter with a subordinated quenching angle controller; and setting a corresponding quenching angle reference value with said superimposed voltage/reactive power controller.

3. Apparatus for controlling active and reactive power transmission between two electrical networks which are each coupled via a high-voltage d-c transmission line (HVDC line), using controlled converters each of which has a control unit for receiving a control angle control variable, with one of said converters operated as a rectifier and the other of said converters operated as an inverter, comprising:

(a) a subordinated current controller for d-c current in the HVDC line which provides the control angle control variable for the control unit of the rectifier converter;

(b) a superimposed power controller for active power in one of said networks, which provides a reference value to said subordinated current controller, (c) a superimposed controller for at least one of the voltage and the reactive power in one of said networks, said superimposed voltage/reactive power controller having its output coupled to the inverter converter for providing the control angle control variable of the control unit of the inverter converter;

(d) a first characteristic generator having as inputs a phase shift angle between the voltage and the current in one of said networks, the ideal no-load d-c voltage, and the d-c current, which said first characteristic generator weights a first control deviation at an input of the superimposed active power controller with a sine function of said phase shift angle, and means for adding with a negative sign said first weighted control deviation as a first pilot control variable to an output signal of the superimposed voltage/reactive power controller; and (e) a second characteristic generator having as inputs said phase shift angle and said ideal no-load d-c voltage, which said second characteristic generator weights a second control deviation at an input of the superimposed voltage/reactive power controller with a sine function of said phase shift angle, divided by the ideal no-load d-c voltage, and means for adding said second weighted control deviation to an output signal of the superimposed active power controller as a second pilot control variable.

4. Apparatus for controlling active and reactive power transmission between two electrical networks which are each coupled via a high-voltage d-c transmission line (HVDC line), using controlled converters each of which has a control unit for receiving a control angle control variable, with one of said converters operated as a rectifier and the other of said converters operated as an inverter, comprising:

(a) a subordinated current controller for d-c current in the HVDC line which provides the control angle control variable for the control unit of the rectifier converter;
(b) a superimposed power controller for active power in one of said networks, which provides a reference value to said subordinated current controller,
(c) a superimposed controller for at least one of the voltage and the reactive power in one of said networks, said superimposed voltage/reactive power controller having its output coupled to the inverter converter for providing the control angle control variable of the control unit of the inverter converter;
(d) a characteristic generator having as an input an active power reference value, said characteristic generator approximating in the form of a straight line with a negative slope, a sine function of a phase shift angle between the voltage and the current in one of said networks divided by an ideal no-load d-c voltage as a function of said active power reference value;
(e) a first multiplier which multiplies an output signal of said characteristic generator and a reciprocal value of the d-c current;
(f) a second multiplier which forms from a control deviation at an input of the superimposed active power controller and said first multiplier output signal a first pilot control variable, and means for adding said first pilot control variable to an output signal of the superimposed voltage/reactive power controller with a negative sign; and
(g) a third multiplier which forms from a control deviation at an input of the superimposed voltage/-reactive power controller and an output signal of said characteristic generator a second pilot control variable, and means for adding said second pilot control variable to an output signal of the superimposed active power controller.

5. Apparatus for controlling active and reactive power transmission between two electrical networks which are each coupled via a high-voltage d-c transmission line (HVDC line), using controlled converters each of which has a control unit for receiving a control angle control variable, with one of said converters operated as a rectifier and the other of said converters operated as an inverter, comprising:

(a) a subordinated current controller for d-c current in the HVDC line which provides the control angle control variable for the control unit of the rectifier converter;
(b) a superimposed power controller for active power in one of said networks, which provides a reference value to said subordinated current controller,
(c) a superimposed controller for at least one of the voltage and the reactive power in one of said networks, said superimposed voltage/reactive power controller having its output coupled to the inverter converter for providing the control angle control variable of the control unit of the inverter converter;
(d) a first characteristic generator having as an input an active power reference value, said first characteristic generator approximating in the form of a straight line with a negative slope, a sine function of a phase shift angle between the voltage and the current in one of the networks divided by an ideal no load d-c voltage as a function of said active power reference;
(e) a second characteristic generator having as an input said active power reference value approximating in the form of a straight line with a negative slope, the sine function of said phase shift angle divided by the product of the ideal no load d-c voltage and d-c current as a function of the active power reference value;
(f) a first multiplier which forms from a control deviation at a input of the superimposed active power controller and an output signal of the second characteristic generator a first pilot control variable, and means for adding said first pilot control variable to the output signal of the superimposed voltage and reactive power controller with a negative sign; and
(g) a second multiplier which forms from a control deviation at an input of the superimposed voltage/-reactive power controller and an output signal of the first characteristic generator a second pilot control variable, and means for adding said second pilot control variable to an output signal of the superimposed active power controller.

6. The apparatus according to claim 3 further comprising a superimposed quenching angle controller which sets said control angle control variable for the control unit of the inverter converter, and which said output signal of said superimposed voltage/reactive power controller is a corresponding reference value.

7. The apparatus according to claim 4 further comprising a superimposed quenching angle controller which sets said control angle control variable for the control unit of the inverter converter, and which said output signal of said superimposed voltage/reactive power controller is a corresponding reference value.

8. The apparatus according to claim 5 further comprising a superimposed quenching angle controller which sets said control angle control variable for the control unit of the inverter converter, and which said output signal of said superimposed voltage/reactive power controller is a corresponding reference value.

9. The apparatus according to claim 3, further comprising further characteristic generators with differentiating delaying behaviors which respectively provide output signals of said superimposed active power controller and said superimposed voltage/reactive power controller to said first and second characteristic generators as input variables.

10. The apparatus according to claim 4, further comprising further characteristic generators with differentiating delaying behaviors which respectively provide output signals of said superimposed active power controller and said superimposed voltage/reactive power controller to said first and second multipliers as input variables.

* * * * *